(12) United States Patent
Hall

(10) Patent No.: US 6,565,006 B1
(45) Date of Patent: May 20, 2003

(54) LOTTERY TICKET IDENTIFICATION AND RECORDING METHOD

(76) Inventor: James H. Hall, 18 Windward Rd., Ft. Worth, TX (US) 76132

( * ) Notice: Subject to any disclaimer, the term of this patent is extended or adjusted under 35 U.S.C. 154(b) by 0 days.

(21) Appl. No.: 10/115,372

(22) Filed: Apr. 4, 2002

(51) Int. Cl.[7] .............................................. G06K 7/10
(52) U.S. Cl. ..................................... 235/470; 235/381
(58) Field of Search ................................. 235/470, 381

(56) References Cited

U.S. PATENT DOCUMENTS 6,086,477 A * 7/2000 Walker et al. .............. 235/470

* cited by examiner

Primary Examiner—Harold I. Pitts

(57) ABSTRACT

A lottery identification and recording method comprising providing a central information data base. A remote lottery machine, having an indicia reader capable of reading bar codes, is electronically linked to a central information data base. Next provided is coupled to the lottery machine. The user inputs lottery information and value amounts of a lottery purchase, which is transmitted to the central data base. The data base identifies the lottery selection and transmits an approval or disapproval the ticket purchase, which the user can accept or reject. If accepted, the financial card account is charged the purchase price of the lottery sequence selection. The lottery machine then prints a ticket with the user's individual sequence and a data base identifying sequence. The lottery is determined by the selection of the winning lottery sequence. The winner is determined from the information in the central data base and the winning ticket purchaser is notified of his or her winning the lottery.

4 Claims, 1 Drawing Sheet

LOTTERY TICKET IDENTIFICATION AND RECORDING METHOD

BACKGROUND OF THE INVENTION

1. Field of the Invention

The present invention relates to a lottery ticket identification and recording method and more particularly pertains to efficiently and conveniently recording lottery purchases.

2. Description of the Prior Art

The use of other known means and apparatuses of known designs and configurations is known in the prior art. More specifically, other known means and apparatuses of known designs and configurations previously devised and utilized for the purpose of determining a lottery winner from among the multiple entries are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,086,477 issued Jul. 11, 2000 to Walker et al discloses a method and apparatus wherein a lottery entry is entered into lottery drawing and the entry (number or numbers) is kept in the drawing until it wins. U.S. Pat. No. 4,815,741 issued Mar. 28, 1989 to Small disclose a lottery system wherein the player inserts an identification card to access funds with which to play. Lastly, U.S. Pat. No. 5,327,485 issued Jul. 5, 1994 to Leaden discloses a telephone lottery system by which a bar code and PIN is used to authenticate an entry.

While these devices fulfill their respective, particular objectives and requirements, the aforementioned patents do not describe a lottery ticket identification and recording method that allows the efficient and convenient recording of lottery purchases.

In this respect, the lottery ticket identification and recording method according to the present invention substantially departs from the conventional concepts and designs of the prior art, and in doing so provides an apparatus primarily developed for the purpose of efficiently and conveniently recording lottery purchases.

Therefore, it can be appreciated that there exists a continuing need for a new and improved lottery ticket identification and recording method which can be used for efficiently and conveniently recording lottery purchases. In this regard, the present invention substantially fulfills this need.

SUMMARY OF THE INVENTION

In view of the foregoing disadvantages inherent in the known types of other known means and apparatuses of known designs and configurations now present in the prior art, the present invention provides an improved lottery ticket identification and recording method. As such, the general purpose of the present invention, which will be described subsequently in greater detail, is to provide a new and improved lottery ticket identification and recording method and method which has all the advantages of the prior art and none of the disadvantages.

To attain this, the present invention essentially comprises a lottery ticket identification and recording method for allowing the user to safely and conveniently have their lottery ticket purchase recorded. The method comprises several steps in combination. The first step is providing a central information data base location for storing lottery ticket information. Next, a remotely located electronic lottery machine is provided. The machine comprises an input keypad, an indicia reader, a processor, a ticket printer, a screen and an electronic communication means to connect the lottery machine to, and to allow the transmission of information to and receipt of information from, the central information base storage location. The method performs a first information entry step. This step includes having an indicia reader, with the indicia that is being read being selected from the class containing bar codes and driver's license identification coding, allowing a purchaser to insert an indicia carrying item into the indicia reader. Such an indicia carrying item may be selected from the class containing such items as driver's licenses and financial cards including credit cards and debit cards. The indicia reader scans and reads the identification coding of the item and stores such information for transmission. The information which is stored is from the class of information containing name, address and indicia decoding. The method next performs a second information entry step whereby the user employs the keypad and inputs lottery information into the indicia reader for transmission. Such information is from the class containing selected number sequences and randomly generated number sequences, being generated by the lottery machine, and word sequences. The user also inputs the value amount of the user's lottery purchase. The method next provides a first communication step whereby the remote lottery machine communicates electronically with the central information base. In this step the lottery machine uploads for transmission, and transmits, the information acquired by the lottery machine by the indicia reader as well as the purchaser input to the central information data base. The method next performs a first processing step whereby the information data base location downloads from the remote lottery machine and takes in the information transmitted by the lottery machine. The central data base attaches an identification sequence to such information and stores such information. The data base then approves or disapproves the purchase of the lottery sequence as received, with such approval being determined by a class of parameters including valid driver's license information determination and valid financial card information determination. Next the method provides a second communication step whereby the information data base location transmits an identification sequence along with an approval code or disapproval code back to the lottery machine at the remote location. The method then performs a second processing step whereby the lottery machine receives the electronic transmission of the code and responds, with the response being one of the class including a rejection of the user's information with termination of purchase and acceptance of user's information with continuation of processing. The method next performs a third information entry step whereby the user makes his selection from the class of choices which includes an acceptance or a termination of the lottery ticket purchase. The method next provides a third communication step whereby the remote lottery machine transmits the user's selection to the data base computer. The method next performs a third processing step whereby the data base acts on the user's selection by performing one of the group of responses which includes a termination and a continuation, with the transmission of approval to the remote lottery machine. Next the method performs a fourth processing step whereby a financial card account is charged the purchase price of the lottery sequence selection. The method next performs a printing step whereby the lottery machine prints a lottery ticket with the user's individual sequence and a data base identifying sequence. The method next conducts a lottery sequence drawing to determine the winning sequence. The method next concludes a determination at the central data base of the owner of the winning lottery sequence. Lastly, the data base provides notification of the winner of the lottery.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lottery ticket identification and recording method which has all of the advantages of the prior art other known means and apparatuses of known designs and configurations and none of the disadvantages.

It is another object of the present invention to provide a new and improved lottery ticket identification and recording method which may be easily and efficiently manufactured and marketed.

It is further object of the present invention to provide a new and improved lottery ticket identification and recording method which is of durable and reliable constructions.

An even further object of the present invention is to provide a new and improved lottery ticket identification and recording method which is susceptible of a low cost of manufacture with regard to both materials and labor, and which accordingly is then susceptible of low prices of sale to the consuming public, thereby making such lottery ticket identification and recording method economically available to the buying public.

Even still another object of the present invention is to provide a lottery ticket identification and recording method for efficiently and conveniently recording lottery purchases.

Lastly, it is an object of the present invention to provide a new and improved lottery ticket identification and recording method comprising providing a central information data base. A remote lottery machine, having an indicia reader capable of reading bar codes, is electronically linked to a central information data base. Next provided is coupled to the lottery machine. The user inputs lottery information and value amounts of a lottery purchase, which is transmitted to the central data base. The data base identifies the lottery selection and transmits an approval or disapproval the ticket purchase, which the user can accept or reject. If accepted, the financial card account is charged the purchase price of the lottery sequence selection. The lottery machine then prints a ticket with the user's individual sequence and a data base identifying sequence. The lottery is determined by the selection of the winning lottery sequence. The winner is determined from the information in the central data base and the winning ticket purchaser is notified of his or her winning the lottery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
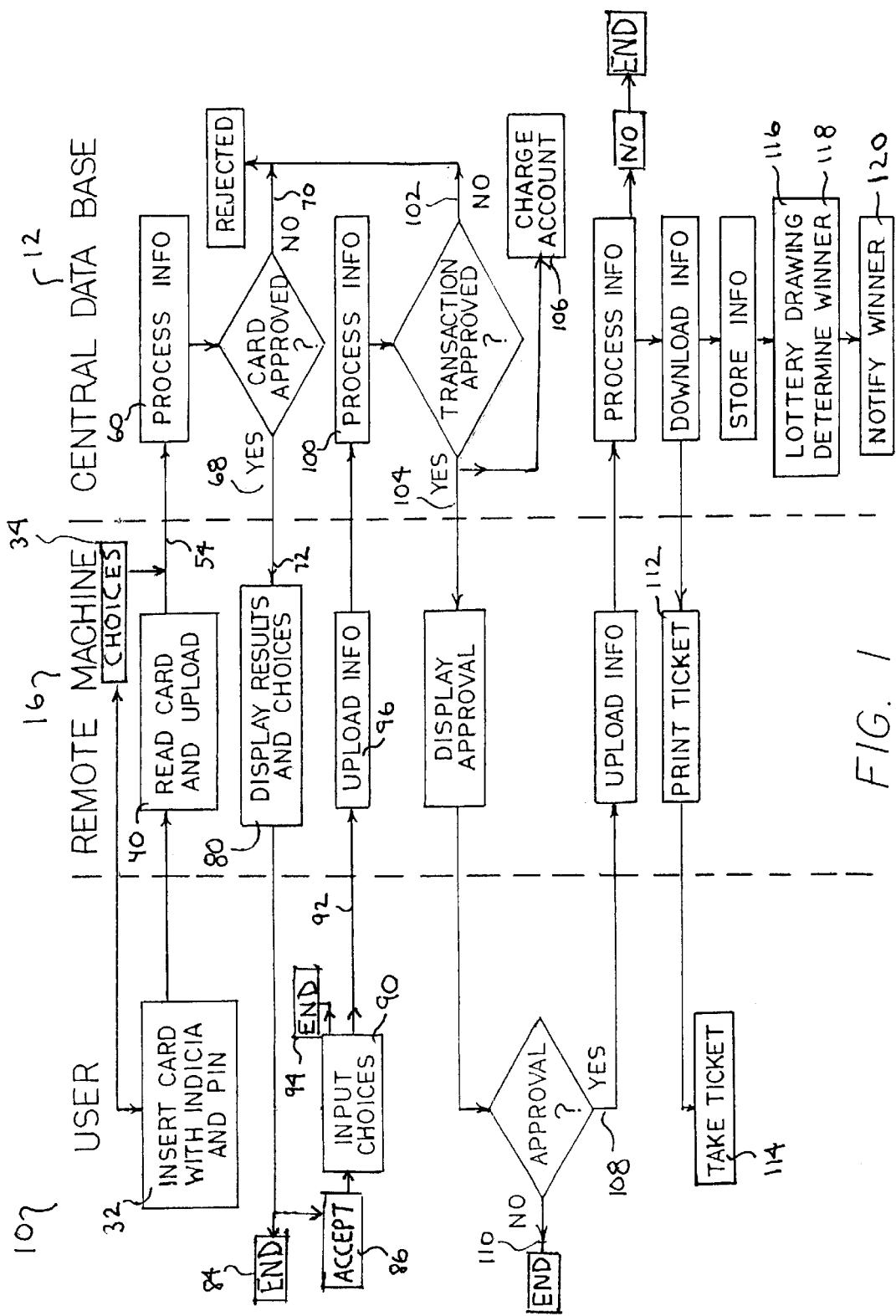
FIG. 1 is a flow sheet of the method.

With reference now to the drawings, and in particular to FIG. 1 thereof, the preferred embodiment of the new and improved lottery ticket identification and recording method embodying the principles and concepts of the present invention and generally designated by the reference numeral 10 will be described.

The present invention, the lottery ticket identification and recording method 10 is comprised of a plurality of components. Such components in their broadest context include a remote lottery machine, a central data base, an electronic means by which the remote and data base can communicate information and printer. Such components are individually configured and correlated with respect to each other so as to attain the desired objective.

A lottery identification and recording method 10 for allowing the user to safely and conveniently have their lottery purchase recorded. The method comprises several steps in combination.

The first step is providing a central information data base location 12 for storing lottery ticket information. Next, a remotely located electronic lottery machine 16 is provided. The machine comprises an input keypad, an indicia reader, a processor, a ticket printer, a screen and an electronic communication means to connect the lottery machine to, and to allow the transmission of information to and receipt of information from the central information base storage location. In the preferred embodiment of the invention, the lottery ticket purchaser would approach a remote lottery machine and input information by typing and entering or passing, also known as swiping, the indicia card through the indicia reader.

The method performs a first information entry step 32. This step includes having an indicia reader, with the indicia that is being read being selected from the class containing bar codes and driver's license identification coding, allowing a purchaser to insert an indicia carrying item into the indicia reader. Such an indicia carrying item may be selected from the class containing such items as driver's licenses and financial cards including credit cards and debit cards. The indicia reader scans and reads 40 the identification coding of the item, and stores such information for transmission. The information which is stored is from the class of information containing name, address and indicia decoding.

The method next performs a second information entry step whereby the user employs the keypad and inputs lottery information into the remote lottery machine for transmission. Such information is from the class containing selected number sequences and randomly generated number sequences, being generated by the lottery machine, and word sequences. The user also inputs the value amount of the user's lottery purchase. In this stage of the preferred embodiment the user inputs his choice of lottery numbers, words or symbols. This sequence is then held for transmission with the other identifying information taken from the indicia reader and the user's card or driver's license.

The method next provides a first communication step 54 whereby the remote lottery machine communicates electronically with the central information base. In this step the lottery machine uploads for transmission, and transmits, the information acquired by the lottery machine by the indicia reader as well as the purchaser input, to the central information data base.

The method next performs a first processing step 60 whereby the information data base location downloads from the remote lottery machine and takes in the information transmitted by the lottery machine. The central data base attaches an identification sequence to such information and stores such information.

The data base then approves 68 or disapproves 70 the purchase of the lottery sequence as received, with such approval being determined by a class of parameters including valid driver's license information determination and valid financial card information determination. If the data so entered and transmitted is determined to be invalid then the central data base will attach to that information an acceptance or rejection code.

Next the method provides a second communication step 72 whereby the information data base location transmits an identification sequence along with an approval code or disapproval code back to the lottery machine at the remote location.

The method then performs a second processing step 80 whereby the lottery machine receives the electronic transmission of the code and responds, with the response being one of the class including a rejection of the user's information with termination of purchase 84 and acceptance 86 of user's information with continuation of processing. The remote lottery machine screen displays the information which is held in the central data base.

The method next performs a third information entry step 90 whereby the user makes his selection from the class of choices which includes an acceptance 92 or a termination 94 of the lottery ticket purchase. In this step the remote lottery machine may display on the screen the information such as lottery number choices for the user's review and decision to accept or reject the data as displayed. The user makes his or her selection and enters the choice to accept or reject the data as displayed.

The method next provides a third communication step 96 whereby the remote lottery machine transmits the user's selection to the data base computer.

The method next performs a third processing step 100 whereby the data base acts on the user's selection by performing one of the group of responses which includes a termination 102 and a continuation 104, with the transmission of approval to the remote lottery machine.

Next the method performs a fourth processing step 106 whereby a financial card account, if one has been used to enter data, is charged the purchase price of the lottery sequence selection. In an alternative embodiment, the purchase of a number sequence may be a multiple of number sequences or a multiple of entries for the same lottery sequence. The approval is communicated to the remote lottery machine location and the information is displayed for user final approval. The user may approve 108 or reject 110 the information and the lottery ticket entry. The acceptance is communicated to the central data base for storage. The complete transaction is downloaded to the remote lottery machine for ticket printing.

The method next performs a printing step 112 whereby the lottery machine prints a lottery ticket 114 with the user's individual sequence and a data base identifying sequence. At this point the lottery data base holds the user's lottery selection coupled with the user's identification information so that even if the lottery winner does not retain his or her lottery ticket, there is sufficient proof that he or she is the rightful winner should his or her chosen sequence be selected by the lottery officials.

The method next conducts a lottery sequence drawing 116 to determine the winning sequence.

The method next concludes a determination 118 at the central data base of the owner of the winning lottery sequence.

Lastly, the data base provides notification 120 of the winner of the lottery.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lottery ticket identification and recording method for allowing the user to safely and conveniently have their lottery ticket purchase recorded comprising, in combination:

providing a central information data base location for storing lottery ticket information;

providing a remotely located electronic lottery machine comprising an input keypad and an indicia reader and a processor and a ticket printer and a screen and an electronic communication means to connect the lottery machine to, and to allow the transmission of information to and receipt of information from, the central information base storage location;

performing a first information entry step including having an indicia reader with the indicia that is being read being selected from the class containing bar codes and driver's license identification coding, the indicia reader allowing a purchaser to insert an indicia carrying item into the indicia reader, such an indicia carrying item being selected from the class containing such items as driver's licenses and financial cards including credit cards and debit cards, with the indicia reader scanning and reading the identification coding of the item and storing such information for transmission, the information stored being from the class of information containing name and address and indicia decoding;

performing a second information entry step whereby the user employs the keypad and inputs lottery information into the indicia reader for transmission, such information being from the class containing selected number sequences and randomly generated number sequences being generated by the lottery machine and word sequences and value amounts of a lottery purchase;

providing a first communication step whereby the remote lottery machine communicates electronically with the central information base and uploads for transmission and transmits the information acquired by the lottery machine by indicia reader and purchaser input to the central information data base;

performing a first processing step whereby the information data base location downloads from the remote lottery machine and takes in the information transmitted by the lottery machine and attaches an identification sequence to such information and stores such information, the data base then approves or disapproves the purchase of the lottery sequence as received, with such approval being determined by a class of parameters including valid driver's license information determination and valid financial card information determination;

providing a second communication step whereby the information data base location transmits an identification sequence along with an approval code or disapproval code back to the lottery machine at the remote location;

performing a second processing step whereby the lottery machine receives the electronic transmission of the code and responds, the response being one of the class including a rejection of the user's information with termination of purchase and acceptance of user's information with continuation of processing, with the remote lottery machine displaying the information collected in the transaction;

performing a third information entry step whereby the user makes his selection from the class of choices which includes an acceptance or a termination of the lottery ticket purchase;

providing a third communication step whereby the remote lottery machine transmits the user's selection to the data base computer;

performing a third processing step whereby the data base acts on the user's selection by performing one of the group of responses which includes a termination and a continuation and transmission of approval to the remote lottery machine;

performing a fourth processing step whereby a financial card account is charged the purchase price of the lottery sequence selection;

performing a printing step whereby the lottery machine prints a lottery ticket with the user's individual sequence and a data base identifying sequence;

conducting a lottery sequence drawing to determine the winning sequence;

concluding a determination at the central data base of the owner of the winning lottery sequence; and providing for notification of the winner.

2. A lottery identification and recording method comprising, in combination:

providing a central information data base location for storing lottery ticket information;

providing a remotely located electronic lottery machine comprising an input keypad and an indicia reader and a processor and a ticket printer and a communication means to connect the lottery machine to a central information data base storage location;

providing a first information entry step having an indicia reader capable of reading bar codes of the class of financial cards including credit cards and debit cards and driver's license codes and storing such information for transmission;

providing a second information entry step whereby the user inputs lottery information and value amounts of a lottery purchase;

providing a first communication step whereby the lottery machine transmits the information to the central data location;

performing a first processing step whereby the information data base location downloads the information and attaches an identification sequence, with the data base approving or disapproving the purchase;

providing a second communication step whereby the information data base location transmits an identification sequence and approval or disapproval code to the remote lottery machine;

performing a second processing step whereby the lottery machine responds, the response being one of the class including a rejection of the user's information with termination of purchase and acceptance of user's information with continuation of processing;

providing a third information entry step whereby the user communicates an acceptance or a termination of the lottery ticket purchase;

providing a third communication step whereby the remote lottery machine transmits the user's selection to the data base computer;

performing a third processing step whereby the data base acts on the user's selection by performing one of the group of responses which includes a termination and a continuation and transmission of approval to the remote lottery machine;

performing a fourth processing step whereby the financial card account is charged the purchase price of the lottery sequence selection;

providing a printing step whereby the lottery machine prints a lottery ticket with the user's individual sequence and a data base identifying sequence;

conducting a winning lottery sequence selection;

concluding a determination of the identification of the winning sequence owner by the central data base; and providing an issuance of notification of winning to the winning sequence owner.

3. A lottery identification and recording method as set forth in claim 2 wherein the system further comprises;

providing a second information entry step wherein the user may enter a plurality of lottery sequence selections with the selections being picked for a plurality of future lottery drawing dates.

4. A lottery identification and recording method as set forth in claim 2 wherein the system further comprises;

providing a second information entry step wherein the user may select that the lottery machine generate a random lottery sequence for a plurality of future lottery drawing dates.

* * * * *